United States Patent
Potereau et al.

(10) Patent No.: US 10,349,174 B2
(45) Date of Patent: Jul. 9, 2019

(54) DEVICE FOR PROCESSING AN AUDIO SIGNAL

(71) Applicants: CONTINENTAL AUTOMOTIVE FRANCE, Toulouse (FR); CONTINENTAL AUTOMOTIVE GmbH, Hannover (DE)

(72) Inventors: Cyrille Potereau, Saint Arnoult en Yvelines (FR); Laurent Thery, Les Essarts le Roi (FR); Jean-Christophe Grzeskowiak, Bu (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/543,854

(22) PCT Filed: Jan. 20, 2016

(86) PCT No.: PCT/EP2016/000098
§ 371 (c)(1),
(2) Date: Jul. 14, 2017

(87) PCT Pub. No.: WO2016/116274
PCT Pub. Date: Jul. 28, 2016

(65) Prior Publication Data
US 2017/0374461 A1 Dec. 28, 2017

(30) Foreign Application Priority Data
Jan. 22, 2015 (FR) ...................................... 15 50526

(51) Int. Cl.
*H04R 29/00* (2006.01)
*H04R 3/04* (2006.01)
(Continued)

(52) U.S. Cl.
CPC ................. *H04R 3/04* (2013.01); *G10L 25/21* (2013.01); *H04B 1/1027* (2013.01); *H04B 1/1661* (2013.01); *H04R 29/00* (2013.01)

(58) Field of Classification Search
CPC ....... H04L 7/085; H04L 7/0816; H04L 7/089; H04L 7/1077; H04L 7/091; H04L 7/087;
(Continued)

(56) References Cited

U.S. PATENT DOCUMENTS 5,077,797 A * 12/1991 Ishikawa .............. H04B 1/1669
381/13
5,172,415 A * 12/1992 Fosgate .................. H04S 5/005
381/22
(Continued)

FOREIGN PATENT DOCUMENTS

EP   1 111 802 A1   6/2001

OTHER PUBLICATIONS

International Search Report, dated Apr. 20, 2016, from corresponding PCT/EP2016/000098 application.

*Primary Examiner* — Leshui Zhang
(74) *Attorney, Agent, or Firm* — Young & Thompson

(57) ABSTRACT

Disclosed is a device (1) for processing an initial audio signal (4), including: a treble detecting block (2) capable of analyzing the initial audio signal to determine a treble level; and a filter block (3) capable of attenuating the initial audio signal in the treble, if the treble level is less than a maximum threshold.

20 Claims, 2 Drawing Sheets

(51) Int. Cl.
*H04B 1/10* (2006.01)
*H04B 1/16* (2006.01)
*G10L 25/21* (2013.01)

(58) Field of Classification Search
CPC .. H04R 3/04; H04R 3/14; G10L 25/15; G10L 25/18; G10L 25/21; H04B 1/1027; H04B 1/1036; H04B 2001/1054; H04B 2001/1063; H04B 2001/072
USPC .. 381/56, 57, 58, 59, 60, 61, 312, 316, 317, 381/318, 320, 321, 93, 94.1, 94.2, 94.3, 381/94.8, 94.9, 97, 98, 99, 100, 101, 102, 381/103, 104, 111–117, 118, 119, 120, 381/121, 122, 73.1, 71.1–71.14; 704/E17.014, E15.039, E19.006, E19.013, 704/234; 379/392.01; 455/43, 71, 113, 455/136, 150.1, 154.1, 161.1, 164.1, 455/173.1, 182.1, 192.1, 275
See application file for complete search history.

(56) References Cited

U.S. PATENT DOCUMENTS

| | | | |
|---|---|---|---|
| 5,533,136 A * | 7/1996 | Smith | H03G 3/342 |
| | | | 381/107 |
| 2005/0238184 A1 * | 10/2005 | Hsieh | H03G 3/3015 |
| | | | 381/104 |
| 2011/0255700 A1 * | 10/2011 | Maxwell | H04R 5/027 |
| | | | 381/58 |

* cited by examiner

DEVICE FOR PROCESSING AN AUDIO SIGNAL

The present invention relates to a device for processing an audio signal being received, in order to improve the audio rendering.

BACKGROUND OF THE INVENTION

In the field of transmission of an audio signal, a signal is sent by a sender, passes through a transmission channel and is then received by a receiver, before being reproduced, typically for the attention of a listener. The transmission channel can introduce interference, mainly in the case of radiofrequency technology. This interference is due mainly to the multiple paths of the waves, the attenuation of the signal and the presence of an adjacent channel. This interference is detrimental to the signal and produces unpleasant listening effects during the reproduction after receipt. Means are therefore sought to improve the audio rendering by removing, during receipt, the consequences of the interference.

The effects resulting from the interference appear mainly, or more harshly, in the treble or high audio frequencies. Moreover, relative to the bass, a removal of the treble is less easily detectable in the ears of a listener.

It is thus known to reduce the high frequencies of the spectrum of the audio signal in the presence of interference.

However, such an approach is slightly too brutal in that it does not take into account the signal and the actual use thereof of the treble.

SUMMARY OF THE INVENTION

The invention overcomes this disadvantage and proposes an audio signal processing device which analyzes the actual use of the treble in the signal before removing said treble, only if, and to the extent that, the treble is not used.

The invention relates to a device for processing an audio signal, comprising:
  a treble detecting block capable of analyzing the audio signal to determine a treble level,
  a filter block capable of attenuating the audio signal in the treble, if the treble level is less than a maximum threshold.

According to another feature, the treble detecting block comprises a determining means that can determine the treble level, like an energy in a detection band related to a total energy of the audio signal.

According to another feature, the detection band extends from 7 kHz to 13 kHz.

According to another feature, the attenuation is performed in an attenuation band extending above 10 kHz.

According to another feature, the attenuation is minimal, preferably zero, when the treble level is greater than or equal to the maximum threshold.

According to another feature, the attenuation is maximal, preferentially total, when the treble level is less than or equal to a minimum threshold, less than the maximum threshold.

According to another feature, the attenuation is linear between the maximum attenuation corresponding to the minimum threshold and the minimum attenuation corresponding to the maximum threshold.

According to another feature, the device further comprises a time block, capable of performing a gradual transition over time, during an activation and/or a deactivation of the filter block.

The invention also relates to a radio receiver comprising such a processing device.

BRIEF DESCRIPTION OF THE DRAWINGS

Other features, details and advantages of the invention will emerge more clearly from the detailed description given hereafter indicatively with reference to drawings, in which.

DETAILED DESCRIPTION OF THE PREFERRED EMBODIMENTS

Figure 1:
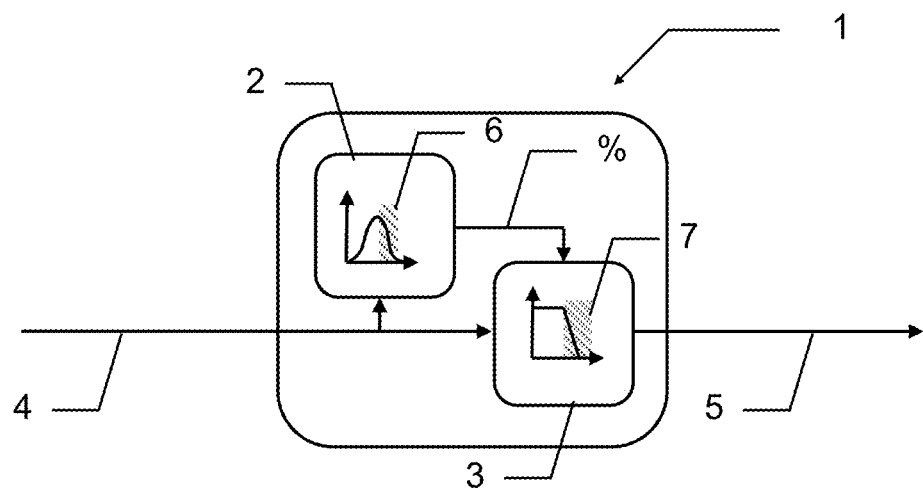
FIG. 1 shows a diagram of the processing device in location.

As illustrated in FIG. 1, the invention illustrates a device 1 for processing an audio signal. The initial audio signal 4, before processing, typically comes from a receiver, for example a radio receiver, and is an audio signal, namely the signal after possible demodulation, capable of being reproduced, by a sound reproduction device, such as an amplifier, a loudspeaker or equivalent, for the attention of a listener. The final audio signal 5 is a similar audio signal, improved by the invention.

According to an embodiment, the processing device 1 according to the invention comprises a treble detecting block 2 and a filter block 3. The treble detecting block 2 is capable of analyzing the initial audio signal 4 to determine a treble level %. The filter block 3 is capable of attenuating the initial audio signal 4 in the treble, if the treble level %, as previously determined, is less than a maximum threshold Smax.

Thus, an initial audio signal 4, comprising little treble as indicated by a low treble level %, in that the treble level % is less than the maximum threshold Smax, is attenuated, in the treble, by the filter block 3. This is advantageous in that the consequences of the interference, particularly present in the treble, are thus attenuated. Moreover, in the absence of treble in the initial audio signal 4, the consequences of the interference would have been much more audible, since they are not masked by the treble specific to the signal. By contrast, the attenuation has few negative consequences on the final audio signal 5 itself, in that the treble, attenuated in this manner, was hardly or not expressed in the initial audio signal 4.

On the contrary, an initial audio signal 4 making great use of treble, as indicated by a high treble level %, in that it is greater than the maximum threshold Smax, is not modified. The reproduction of the initial audio signal 4 in the entirety thereof is preferred. Possible interference may be present in the initial audio signal 4, but it is less audible in the presence of treble in the initial audio signal 4.

Figure 2:
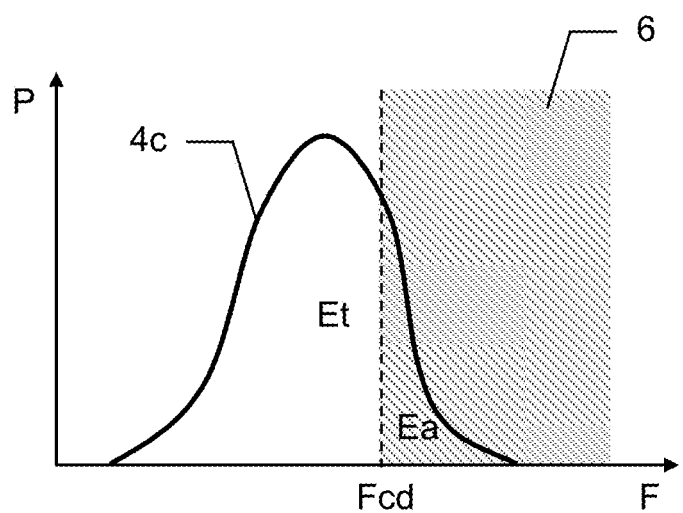
FIG. 2 illustrates the principle of determining the treble level.

The treble detecting block 2 operates according to a principle illustrated in FIG. 2. FIG. 2 shows a spectral view of the initial audio signal 4 according to a diagram depicting the spectral power P on the Y-axis as a function of the frequency F on the X-axis. The treble detector 2 determines a treble level % by relating an energy in the treble Ea to a total energy Et of the signal. The energy in the treble Ea is determined for a spectral part of the initial audio signal 4 included in a frequency band called a detection band 6. The total energy Et is determined, in the same way, for the entire spectrum. Thus, graphically, the energy Ea is the surface area defined under the curve 4c in the detection band 6, namely to the right of a detection cut-off frequency Fcd, and the total energy Et is the surface area defined under the curve 4c throughout the spectrum. The treble level % is determined by the ratio %=Ea/Et.

Thus, the treble detector 2 advantageously uses a band-pass filter on the detection band 6, or a high-pass filter with a cut-off frequency at the detection cut-off frequency Fcd.

It has been previously seen that the treble detector 2 operates with detection in the treble. Thus, the detection band 6 is advantageously arranged in the audio frequencies corresponding to the treble. The low and high limits of the detection band 6 can advantageously be set, in order to optimize the performance of the processing device 1.

According to an embodiment, the low limit, or detection cut-off frequency Fcd, is taken substantially equal to 7 kHz and the high limit is taken substantially equal to 13 kHz.

The objective of the calculation of the treble level % is to characterize a profile of the initial audio signal 4 in terms of the presence or absence of treble. Such a treble profile generally does not require a determination that is too frequent. An excessively high determination frequency may turn out to be counterproductive. Thus, for an initial audio signal 4 representing a piece of music, the treble profile must advantageously be substantially the same for the entire piece of music. Detrimentally, a determination that is too frequent could determine a more high-pitched or more low-pitched value for an isolated note.

Thus, according to an advantageous feature, the treble detecting block 2 advantageously comprises an application of a statistical function to the determination of the treble level %. This statistical function is typically a time average over a sliding window. The time constant of such a function is a compromise between a sufficiently rapid detection of a significant change in the initial audio signal 4, such as the end of a range, of a piece of music, and a detection that is sufficiently slow to not be influenced by local variations within a same range. Such a time constant is advantageously a configurable parameter, in order to optimize the performance of the processing device 1.

Figure 4:
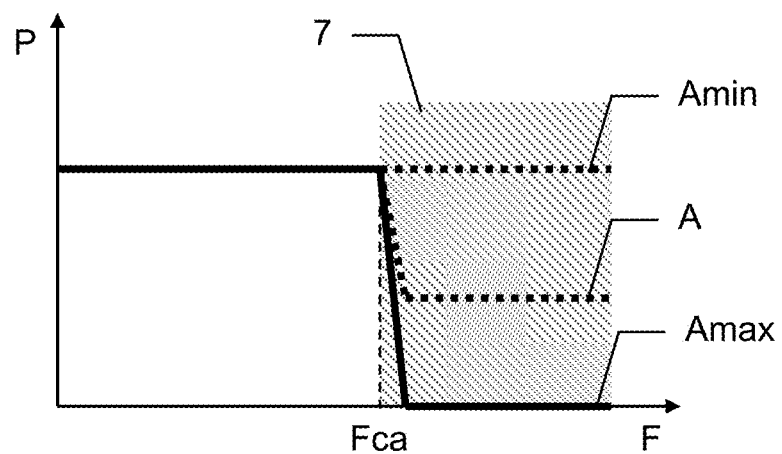
FIG. 4 details the filter block.

As shown in FIG. 4, a filter block 3 applies an attenuation as a function of the treble level % determined by the treble detector 2. FIG. 4 shows a spectral diagram depicting the spectral power P on the Y-axis as a function of the frequency F on the X-axis. An attenuation A is advantageously carried out in a frequency band called an attenuation band 7, in order to be frequency-selective. It has been previously seen that this attenuation is advantageously applied in the treble. Thus, the attenuation band 7 is typically defined by a low limit or attenuation cut-off frequency Fca and by a high limit corresponding, typically, to the highest frequency of the audio signal or of the audible spectrum. Below the attenuation cut-off frequency Fca, namely for the lower frequencies, the initial audio signal 4 is substantially unchanged. The low limit of the attenuation band 7 or attenuation cut-off frequency Fca is advantageously a configurable parameter, in order to optimize the performance of the processing device 1. It can be preferentially equal to 10 kHz.

According to an embodiment, a single threshold, Smax, determines whether or not the attenuation is applied. A maximum attenuation Amax is applied if the treble level % is less than the threshold Smax and a minimum attenuation Amin is applied if the treble level % is greater than the threshold Smax.

Throughout the present document, a maximum attenuation can advantageously correspond to a total attenuation, producing an extinction of the initial audio signal 4, in the action band thereof. Likewise, throughout the present document, a minimum attenuation can advantageously correspond to a zero attenuation, leaving the initial audio signal 4 unchanged, in the action band thereof.

Figure 3:
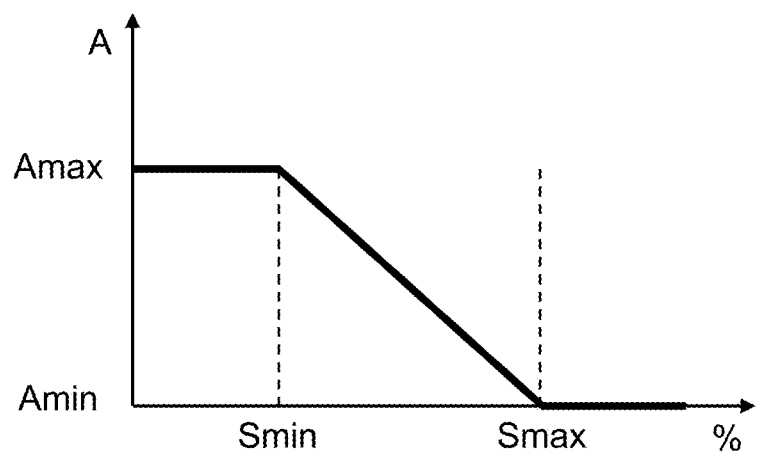
FIG. 3 details the use of the treble level to configure the filter block.

According to a more progressive embodiment, illustrated in FIG. 3, depicting a diagram indicating the attenuation A on the Y-axis as a function of the treble level % on the X-axis, a second threshold or minimum threshold Smin, less than the first maximum threshold Smax, is used. In this embodiment, the maximum threshold Smax indicates the transition between a minimum attenuation Amin, when the treble level % is greater than or equal to the maximum threshold Smax and a greater attenuation than the minimum attenuation Amin, when the treble level % is less than the maximum threshold Smax. Symmetrically, the minimum threshold Smin indicates the transition between a maximum attenuation Amax, when the treble level % is less than or equal to the minimum threshold Smin and an attenuation that is smaller than the maximum attenuation Amax, when the treble level % is greater than the minimum threshold Smin.

Thus, such an embodiment offers a progressive attenuation over the range of treble level % between the two thresholds Smin and Smax.

The curve of FIG. 3 between the two thresholds Smin, Smax can have any shape. However, it is advantageously decreasing. Thus, the attenuation is advantageously applied to the measurement of the amount of treble present in the initial audio signal 4.

According to a preferred embodiment, as illustrated, the attenuation A is linear between the two thresholds, namely between the maximum attenuation point Amax corresponding to the minimum threshold Smin and the minimum attenuation point Amin corresponding to the maximum threshold Smax.

As illustrated in FIG. 4, showing the diagram of the filter 3 performing the attenuation, the attenuation A determined in this manner, defines the form of the filter 3 in the attenuation band 7 only.

According to another feature, the device 1 further comprises a time block, not shown. Such a block is configured such as to carry out a gradual transition over time. Indeed, during a transition, whether it is an activation transition, when the filter block 3 changes from an inactive state to an active state, or a deactivation transaction when the filter block 3 changes from an active state to an inactive state, it is preferable to avoid abrupt changes, which are potentially unpleasant to the ears of a listener. Thus, such a time block is responsible for an advantageously linear, temporally progressive application or deactivation, respectively, of the filter block 3. Such a time block is typically parameterized by an activation time, ta, and by a deactivation time, td. Thus, in the case of an activation, at the initial instant t0, the time module maintains a zero action of the filter block 3, and proportionately increases said action until a complete action is obtained at the instant t0+ta. In the case of a deactivation, at the initial instant t0, the time module maintains a total action of the filter block 3, and proportionally decreases said action until a zero action is obtained at the instant t0+td.

The invention also relates to a radio receiver comprising such a processing device 1, according to any one of the preceding embodiments.

The invention claimed is:

1. A device (1) for processing an initial audio signal (4) defined by a spectrum of frequencies, the device comprising:
  a treble detecting block (2) that analyzes the initial audio signal (4) and determines a treble level of the initial audio signal, where the treble level indicates a level of energy of a treble portion of the initial audio signal defined by a detection band of treble frequencies; and a filter block (3) that, on condition that the treble level detected by the treble detecting block is less than a maximum threshold (Smax), attenuates the initial audio signal (4) at frequencies that exceed an attenuation cut-off frequency ($F_{ca}$), said attenuation cut-off frequency ($F_{ca}$) being a frequency inside the detection band of treble frequencies.

2. The device (1) as claimed in claim 1, wherein the treble detecting block (2) comprises a determining means that determines the treble level as a ratio of an energy (Ea) of the initial audio signal (4) in the detection band (6) to a total energy (Et) of the initial audio signal (4).

3. The device (1) as claimed in claim 2, wherein the detection band (6) extends from 7 kHz to 13 kHz.

4. The device (1) as claimed in claim 3, wherein the attenuation cut-off frequency $F_{ca}$, is 10 kHz.

5. The device (1) as claimed in claim 4, wherein the filter block performs minimal attenuation (Amin) when the determined treble level is greater than or equal to the maximum threshold (Smax).

6. The device (1) as claimed in claim 3, wherein the filter block performs minimal attenuation (Amin) when the determined treble level is greater than or equal to the maximum threshold (Smax).

7. The device (1) as claimed in claim 3, wherein the filter block performs zero attenuation when the treble level is greater than or equal to the maximum threshold (Smax).

8. The device (1) as claimed in claim 2, wherein the attenuation cut-off frequency $F_{ca}$, is 10 kHz.

9. The device (1) as claimed in claim 8, wherein the filter block performs minimal attenuation (Amin) when the determined treble level is greater than or equal to the maximum threshold (Smax).

10. The device (1) as claimed in claim 2, wherein the filter block performs minimal attenuation (Amin) when the determined treble level is greater than or equal to the maximum threshold (Smax).

11. The device (1) as claimed in claim 2, wherein the filter block performs zero attenuation when the treble level is greater than or equal to the maximum threshold (Smax).

12. The device (1) as claimed in claim 1, wherein the attenuation cut-off frequency $F_{ca}$, is 10 kHz.

13. The device (1) as claimed in claim 12, wherein the filter block performs minimal attenuation (Amin) when the determined treble level is greater than or equal to the maximum threshold (Smax).

14. The device (1) as claimed in claim 1, wherein the filter block performs minimal attenuation (Amin) when the determined treble level is greater than or equal to the maximum threshold (Smax).

15. The device (1) as claimed in claim 1, wherein the filter block performs zero attenuation when the treble level is greater than or equal to the maximum threshold (Smax).

16. The device (1) as claimed in claim 1, wherein the attenuation (A) performed by the filter block is maximal (Amax) when the treble level is less than or equal to a minimum threshold (Smin), said minimum threshold (Smin) being less than the maximum threshold (Smax).

17. The device (1) as claimed in claim 1, wherein the attenuation (A) performed by the filter block is total when the treble level is less than or equal to a minimum threshold (Smin), said minimum threshold (Smin) being less than the maximum threshold (Smax).

18. The device (1) as claimed in claim 1, wherein the attenuation (A) performed by the filter block is applied linearly by the filter block as a function of the treble level detected by the treble detecting block, between a maximum attenuation (Amax) corresponding to the minimum threshold (Smin) and a minimum attenuation (Amin) corresponding to the maximum threshold (Smax).

19. The device (1) as claimed in claim 1, further comprising:
   a time block that causes an activation and/or a deactivation of the filter block (3) to be performed as a transition over a non-zero period of time.

20. A radio receiver comprising the device (1) as claimed in claim 1.

* * * * *